(12) United States Patent
Zhuang et al.

(10) Patent No.: US 12,131,627 B2
(45) Date of Patent: Oct. 29, 2024

(54) TACTILE FEEDBACK SYSTEM

(71) Applicant: TDK TAIWAN CORP., Taoyuan (TW)

(72) Inventors: Po-Xiang Zhuang, Taoyuan (TW); Wei-Jhe Shen, Taoyuan (TW); Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 52 days.

(21) Appl. No.: 17/944,472

(22) Filed: Sep. 14, 2022

(65) Prior Publication Data

US 2023/0082793 A1 Mar. 16, 2023

Related U.S. Application Data

(60) Provisional application No. 63/243,879, filed on Sep. 14, 2021.

(51) Int. Cl.
| | |
|---|---|
| *G08B 6/00* | (2006.01) |
| *G02B 7/04* | (2021.01) |
| *H02N 2/00* | (2006.01) |
| *H04N 23/51* | (2023.01) |
| *H04N 23/54* | (2023.01) |
| *H04N 23/55* | (2023.01) |
| *H04N 23/57* | (2023.01) |
| *H04N 23/60* | (2023.01) |

(52) U.S. Cl.
CPC ................ *G08B 6/00* (2013.01); *G02B 7/04* (2013.01); *H02N 2/001* (2013.01); *H04N 23/51* (2023.01); *H04N 23/54* (2023.01); *H04N 23/55* (2023.01); *H04N 23/57* (2023.01); *H04N 23/60* (2023.01); *G03B 2205/0069* (2013.01)

(58) Field of Classification Search
CPC . G08B 6/00; G02B 7/04; H02N 2/001; H02N 23/51; H02N 23/54; H02N 23/55
USPC ........................................................ 340/407.1
See application file for complete search history.

(56) References Cited

U.S. PATENT DOCUMENTS

| | | | | |
|---|---|---|---|---|
| 2011/0255260 | A1* | 10/2011 | Weber .................... | H01H 13/04 200/341 |
| 2012/0038469 | A1* | 2/2012 | Dehmoubed ........... | G06F 3/016 340/407.1 |
| 2012/0038562 | A1* | 2/2012 | Holman, IV ............ | G06F 3/016 345/173 |
| 2017/0091436 | A1* | 3/2017 | Cao ........................ | G06F 1/1662 |
| 2018/0281020 | A1* | 10/2018 | Katada .................... | B06B 1/045 |
| 2020/0329572 | A1* | 10/2020 | Wittenberg ........... | G06F 1/1624 |
| 2020/0356162 | A1* | 11/2020 | Wang ...................... | G06F 3/017 |
| 2021/0168230 | A1* | 6/2021 | Baker ................... | G06F 1/1698 |
| 2022/0079795 | A1* | 3/2022 | Gross .................. | A61B 5/6843 |
| 2022/0200432 | A1* | 6/2022 | Ilkorur .................. | H04R 11/02 |

* cited by examiner

*Primary Examiner* — Jack K Wang
(74) *Attorney, Agent, or Firm* — MUNCY, GEISSLER, OLDS & LOWE, P.C.

(57) ABSTRACT

A tactile feedback system is provided. The tactile feedback system includes a fixed portion, a first movable portion, a second movable portion, and a driving assembly. The first movable portion is movable relative to the fixed portion. The second movable portion is movable relative to the fixed portion and the first movable portion. The driving assembly is configured to drive the first movable portion to move relative to the fixed portion.

18 Claims, 9 Drawing Sheets

TACTILE FEEDBACK SYSTEM

CROSS REFERENCE TO RELATED APPLICATIONS

This application claims the benefit of U.S. Provisional Application No. 63/243,879 filed Sep. 9, 2021, the entirety of which is incorporated by reference herein.

BACKGROUND OF THE INVENTION

Field of the Invention

The present disclosure relates to a tactile feedback system, and more particularly to a tactile feedback system with two movable portions.

Description of the Related Art

Many electronic devices (for example, mobile phones, tablets, etc.) used nowadays generally include a tactile feedback mechanism that generates vibrations, to respond to an operation that the user performs on the electronic device. How to generate multiple vibration sensations in a tactile feedback system is an important issue.

BRIEF SUMMARY OF THE INVENTION

A tactile feedback system is provided. The tactile feedback system includes a fixed portion, a first movable portion, a second movable portion, and a driving assembly. The first movable portion is movable relative to the fixed portion. The second movable portion is movable relative to the fixed portion and the first movable portion. The driving assembly is configured to drive the first movable portion to move relative to the fixed portion.

In some embodiments of the present disclosure, the tactile feedback system further includes a first connecting assembly. The first movable portion is movably connected to the fixed portion via the first connecting assembly.

In some embodiments of the present disclosure, the first connecting assembly includes a first elastic component and a second elastic component. The shapes of the first elastic component and the second elastic component have rotational symmetry.

In some embodiments of the present disclosure, the tactile feedback system further includes a second connecting assembly. The second movable portion is movably connected to the first movable portion via the second connecting assembly.

In some embodiments of the present disclosure, the first movable portion includes a protrusion including a connecting surface. The second connecting assembly includes a fixed end. The connecting surface is connected to the fixed end of the second connecting assembly.

In some embodiments of the present disclosure, the second connecting assembly includes a third elastic component and a fourth elastic component. The shapes of the third elastic component and the fourth elastic component have rotational symmetry.

In some embodiments of the present disclosure, the driving assembly includes a magnetic component and a coil. The first connecting assembly includes a first elastic component and a second elastic component. A first direction, which is the direction from the first elastic component to the second elastic component, is perpendicular to a second direction, which is the direction from the second movable portion to the first movable portion.

In some embodiments of the present disclosure, the first connecting assembly and the second connecting assembly do not overlap in the first direction.

In some embodiments of the present disclosure, the first connecting assembly and the second connecting assembly partially overlap in the second direction.

In some embodiments of the present disclosure, the first connecting assembly and the driving assembly at least partially overlap in the first direction.

In some embodiments of the present disclosure, the first connecting assembly and the magnetic component at least partially overlap in the first direction.

In some embodiments of the present disclosure, the first connecting assembly and the coil do not overlap in the first direction.

In some embodiments of the present disclosure, the second connecting assembly and the driving assembly at least partially overlap in the first direction.

In some embodiments of the present disclosure, the second connecting assembly and the coil at least partially overlap in the first direction.

In some embodiments of the present disclosure, the second connecting assembly and the magnetic component do not overlap in the first direction.

In some embodiments of the present disclosure, the driving assembly includes a magnetically permeable component. The first movable portion and the second movable portion each have a non-magnetically permeable metal.

In some embodiments of the present disclosure, the magnetic permeability of the magnetically permeable component is greater than the magnetic permeability of the first movable portion and the magnetic permeability of the second movable portion.

In some embodiments of the present disclosure, the tactile feedback system further includes a first connecting assembly, a second connecting assembly, a first buffer component, and a second buffer component. The first movable portion is movably connected to the fixed portion via the first connecting assembly. The second movable portion is movably connected to the first movable portion via the second connecting assembly. The first buffer component is disposed between the fixed portion and the first movable portion. The second buffer component is disposed between the fixed portion and the second movable portion. The first buffer component and the second buffer component both have an elongated structure. The first buffer component and the second buffer component extend in different directions. A first direction is from the second buffer component to the second connecting assembly. The first connecting assembly and the second buffer component do not overlap in the first direction. The second connecting assembly and the first buffer component at least partially overlap in the first direction.

In some embodiments of the present disclosure, when the driving assembly outputs a first driving signal with a first frequency, the first movable portion moves relative to the fixed portion in a first motion mode, and the second movable portion moves relative to the fixed portion in a second motion mode. When the driving assembly outputs a second driving signal with a second frequency, the first movable portion moves relative to the fixed portion in the first motion mode, and the second movable portion moves relative to the fixed portion in a third motion mode.

In some embodiments of the present disclosure, the second motion mode is different from the third motion mode.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

In order to make the purpose, features, and advantages of the present disclosure more obvious and understandable, the following embodiments are specially cited, and the accompanying drawings are used for detailed description. Among them, the configuration of each component in the embodiment is for illustration purposes, and is not intended to limit the disclosure. In addition, part of the repetition of the reference numbers in the embodiments is for simplifying the description, and does not mean the relevance between different embodiments. The directional terms mentioned in the following embodiments, for example: up, down, left, right, front or back, etc., are only directions for referring to the attached drawings. Therefore, the directional terms used are used to illustrate and not to limit the disclosure.

In addition, relative terms such as "lower" or "bottom" and "higher" or "top" may be used in the embodiments to describe the relative relationship between one component of the illustration and another component. It can be understood that if the illustrated device is turned upside down, the components described on the "lower" side will become the components on the "higher" side.

The tactile feedback system of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 1A:
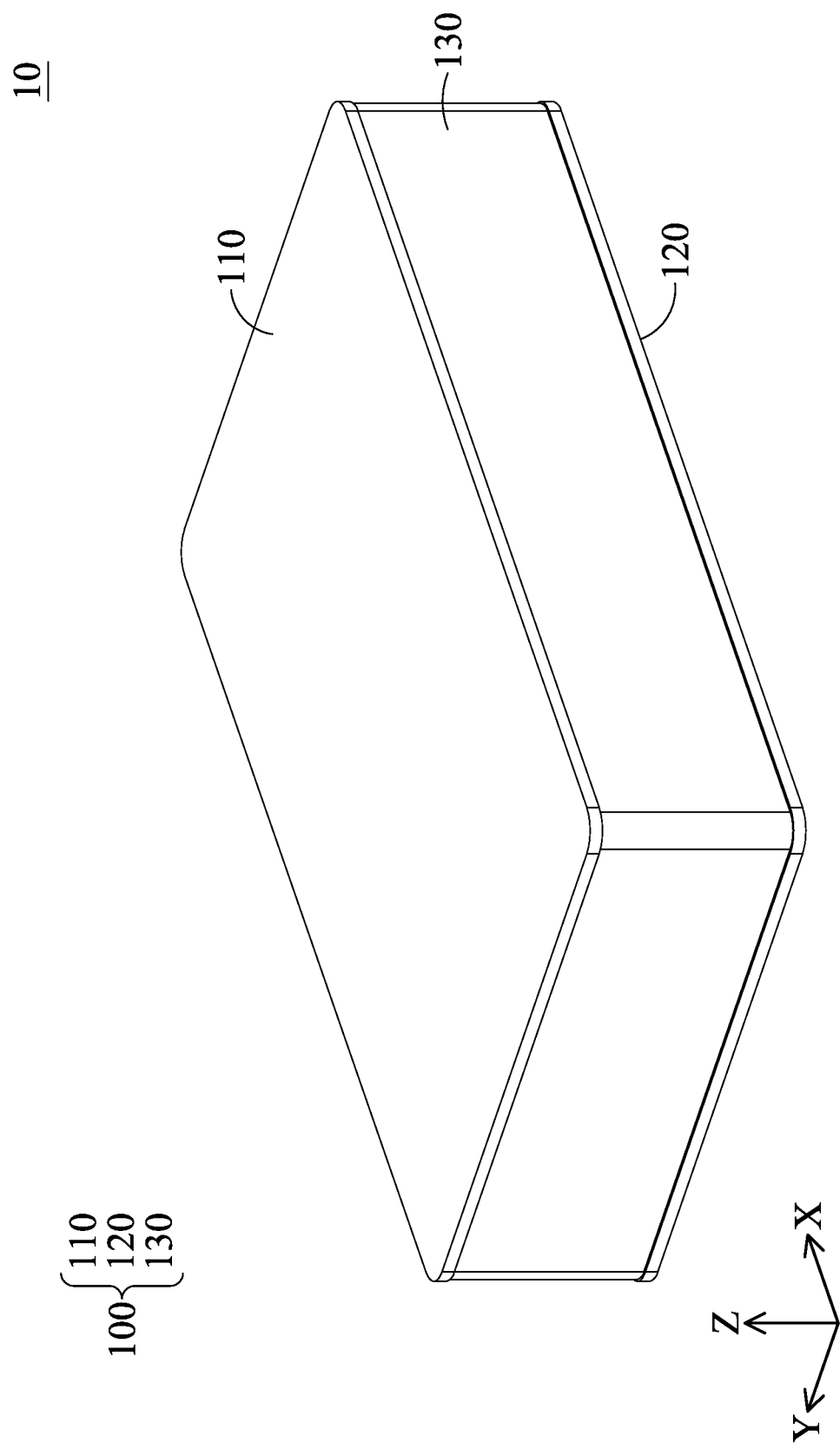
FIG. 1A shows a perspective view of a tactile feedback system, according to some embodiments of the present disclosure.
Figure 1B:
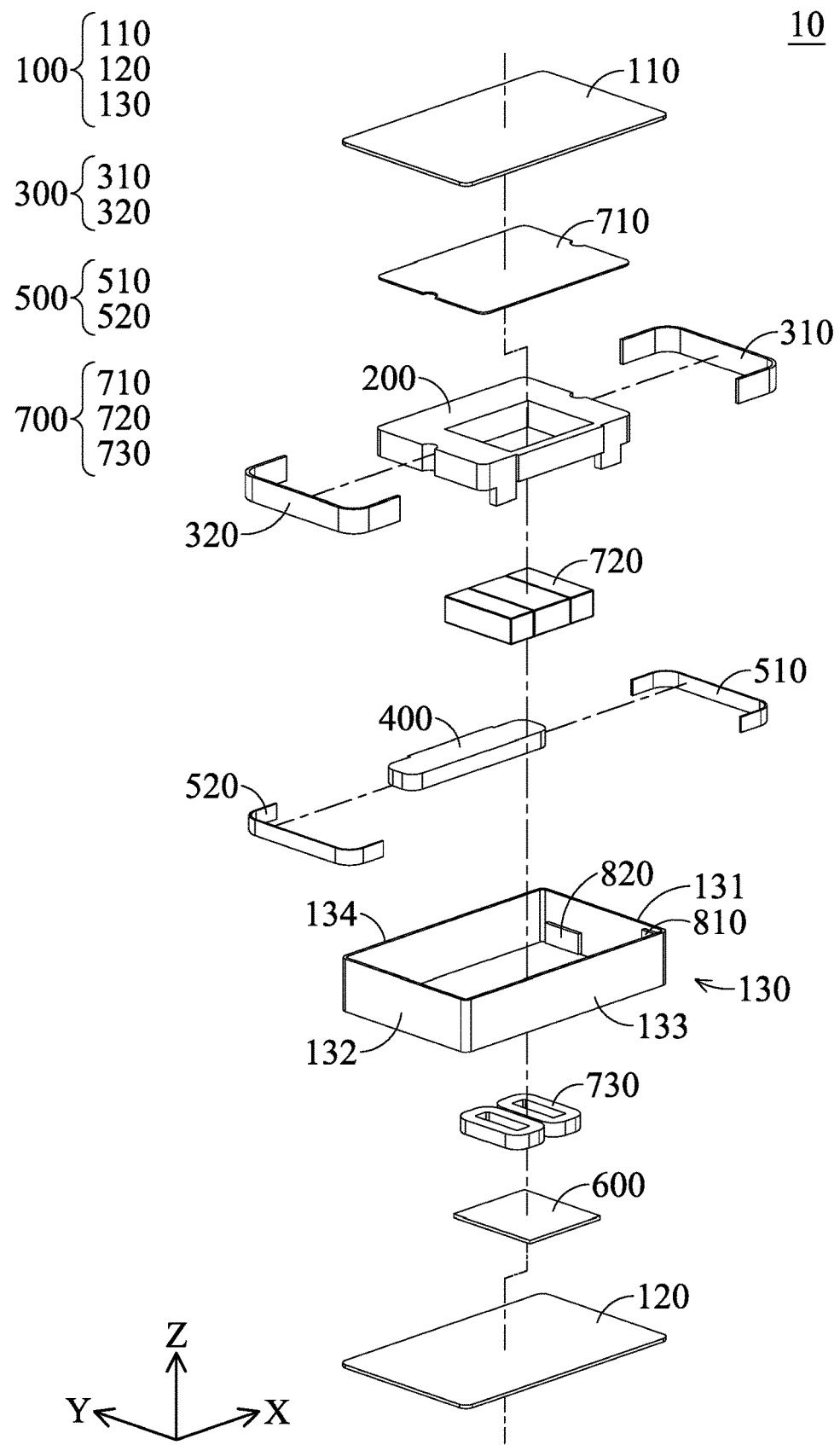
FIG. 1B shows an exploded view of the tactile feedback system, according to some embodiments of the present disclosure.

FIG. 1A shows a perspective view of a tactile feedback system 10, according to some embodiments of the present disclosure. FIG. 1B shows an exploded view of the tactile feedback system 10, according to some embodiments of the present disclosure. The aforementioned tactile feedback system 10 is disposed inside an electronic device such as a mobile phone, so as to provide feedback responding to an operation that the user performs on the electronic device. The detailed structure of the tactile feedback system 10 is described below.

Please refer to FIG. 1A to FIG. 1B, the tactile feedback system 10 includes a fixed portion 100, a first movable portion 200, a first connecting assembly 300, a second movable portion 400, a second connecting assembly 500, a circuit member 600, a driving assembly 700, two first buffer components 810, and two second buffer components 820.

According to some embodiments of the present disclosure, the fixed portion 100 is made of metal material. The fixed portion 100 includes an upper cover 110, a lower cover 120, and a case 130. The upper cover 110 and the lower cover 120 are connected with the upper end and the lower end of the case 130 respectively, to form an accommodating space for accommodating other components of the tactile feedback system 10.

The case 130 includes a first sidewall 131, a second sidewall 132, a third sidewall 133, and a fourth sidewall 134. The first sidewall 131 and the second sidewall 132 are located on opposite sides of the case 130. The first sidewall 131 is parallel to the second sidewall 132. The third sidewall 133 and the fourth sidewall 134 are located on opposite sides of the case 130. The third sidewall 133 is parallel to the fourth sidewall 134. The first sidewall 131 and the second sidewall 132 are perpendicular to the third sidewall 133 and the fourth sidewall 134.

According to some embodiments of the present disclosure, the first movable portion 200 is a counterweight that is movable relative to the fixed portion 100. The first movable portion 200 is made of non-magnetically permeable metal. The first movable portion 200 is movably connected to the fixed portion 100 via the first connecting assembly 300. According to some embodiments of the present disclosure, the first connecting assembly 300 includes a first elastic component 310 and a second elastic component 320.

According to some embodiments of the present disclosure, the first elastic component 310 and the second elastic component 320 are disposed on two sides of the first movable portion 200. The first elastic component 310 is adjacent to the first sidewall 131. The second elastic component 320 is adjacent to the second sidewall 132.

In the present embodiment, the first elastic component 310 and the second elastic component 320 each have a substantially C-shaped structure. The connection relationship between the first elastic component 310 and the first movable portion 200 and the connection relationship between the second elastic component 320 and the first movable portion 200 are described in detail with reference to FIG. 2A to FIG. 2C.

For convenience of description, the direction (the −X direction) from the first elastic component 310 to the second elastic component 320 is referred to as the first direction. The direction (the Z direction) from the lower cover 120 to the upper cover 110 is referred to as the second direction. The first direction is perpendicular to the second direction.

According to some embodiments of the present disclosure, the second movable portion 400 is a counterweight that is movable relative to the fixed portion 100. The second movable portion 400 is made of a non-magnetically permeable metal. The second movable portion 400 is movably connected to the first movable portion 200 via the second connecting assembly 500. The second movable portion 400 is in an elongated shape. The second movable portion 400 is adjacent to the fourth sidewall 134.

According to some embodiments of the present disclosure, the second connecting assembly 500 includes a third elastic component 510 and a fourth elastic component 520. The third elastic component 510 and the fourth elastic component 520 are disposed on two sides of the second movable portion 400. The third elastic component 510 is adjacent to the first sidewall 131. The fourth elastic component 520 is adjacent to the second sidewall 132.

In the present embodiment, the third elastic component 510 and the fourth elastic component 520 respectively have a substantially C-shaped structure. The connection relationship between the third elastic component 510 and the fourth elastic component 520 and the first movable portion 200 is described in detail with reference to FIGS. 2A to 2C. The connection relationship between the third elastic component 510 and the fourth elastic component 520 and the second movable portion 400 is also described in detail with reference to FIGS. 2A to 2C.

According to some embodiments of the present disclosure, the circuit member 600 may be a flexible printed circuit board. The circuit member 600 is fixedly disposed on the lower cover 120 and is electrically connected to an external circuit (not shown). The circuit member 600 is electrically connected to the driving assembly 700.

According to some embodiments of the present disclosure, the driving assembly 700 includes a magnetically permeable component 710, a set of magnetic components 720, and a set of coils 730. The magnetically permeable component 710 is disposed on the first movable portion 200. The magnetic components 720 are disposed in the first movable portion 200, and the configuration relationship between the magnetic components 720 and the first movable portion 200 is more clearly shown with reference to FIGS. 2A to 2C. The coils 730 are disposed on the circuit member 600.

The magnetically permeable component 710 may concentrate the magnetic force of the magnetic components 720 in a predetermined direction, so as to enhance the magnetic thrust of the driving assembly 700 to drive the first movable portion 200 to move. The magnetic permeability of the magnetically permeable component 710 is greater than the magnetic permeability of the first movable portion 200 and the second movable portion 400.

When a driving signal is applied to the driving assembly 700 (e.g., current is applied by an external power source), a magnetic force is generated between the magnetic components 720 and the coils 730, which may drive the first movable portion 200 to move relative to the fixed portion 100.

Since the second movable portion 400 is movably connected to the first movable portion 200 via the second connecting assembly 500, the second movable portion 400 is driven to generate a relative movement relative to the fixed portion 100 and the first movable portion 200 when the driving assembly 700 drives the first movable portion 200.

According to some embodiments of the present disclosure, the first buffer components 810 and the second buffer components 820 are disposed on the case 130. The first buffer components 810 and the second buffer components 820 may buffer the direct impact on the case 130 from the first movable portion 200 or the second movable portion 400 when the first movable portion 200 or the second movable portion 400 move abnormally. The first buffer components 810 and the second buffer components 820 may prevent the tactile feedback system 10 from generate abnormal sound when the first movable portion 200 and the second movable portion 400 move abnormally. The first buffer components 810 and the second buffer components 820 are made of soft materials such as silicone, foam, or sponge. Parts of the first buffer components 810 and the second buffer components 820 are blocked in FIG. 1B, the details of which is described in detail with reference to FIG. 3.

Figure 2A:
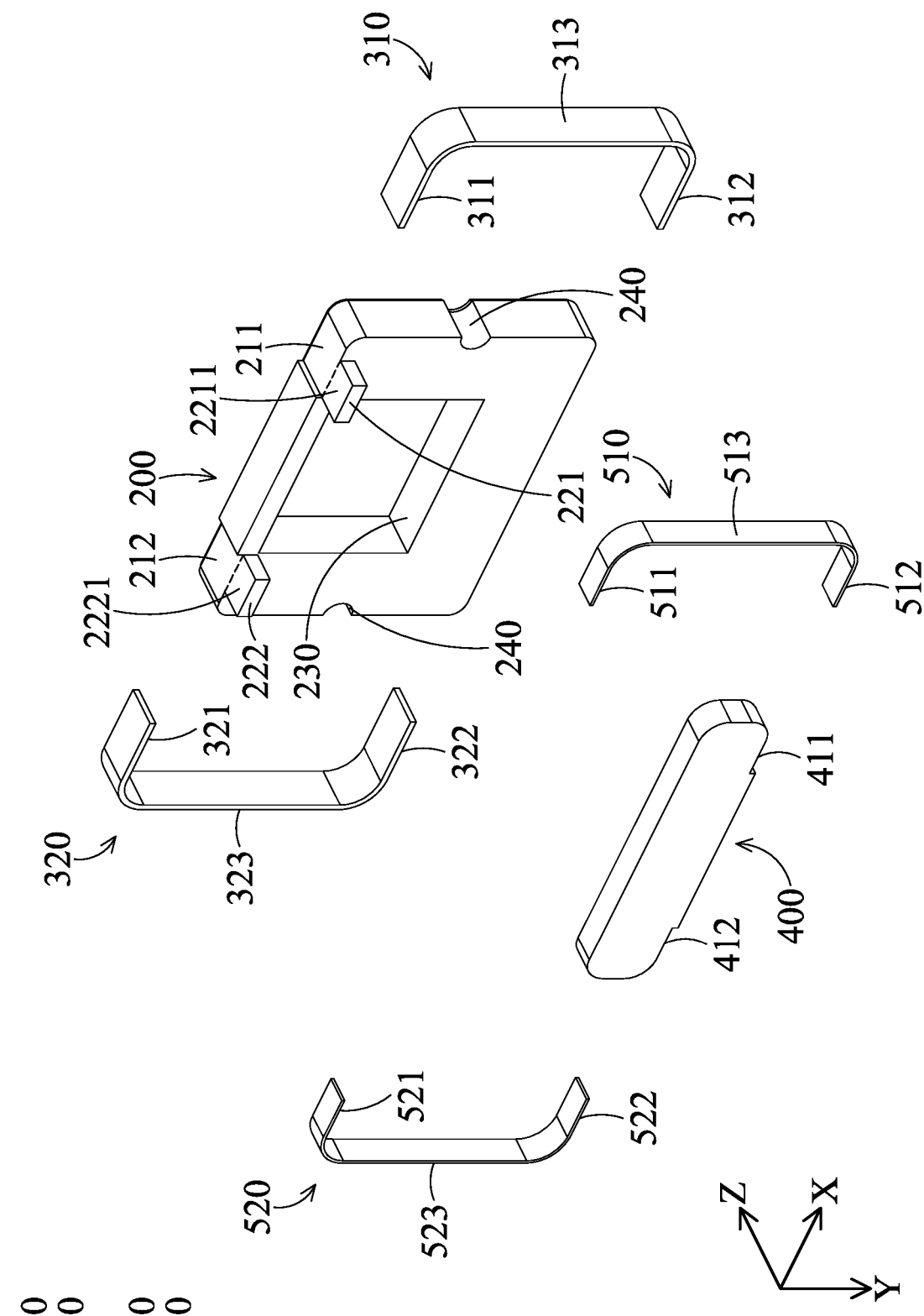
FIG. 2A shows an exploded view of a first movable portion, a first connecting assembly, a second movable portion, and a second connecting assembly, according to some embodiments of the present disclosure.
Figure 2B:
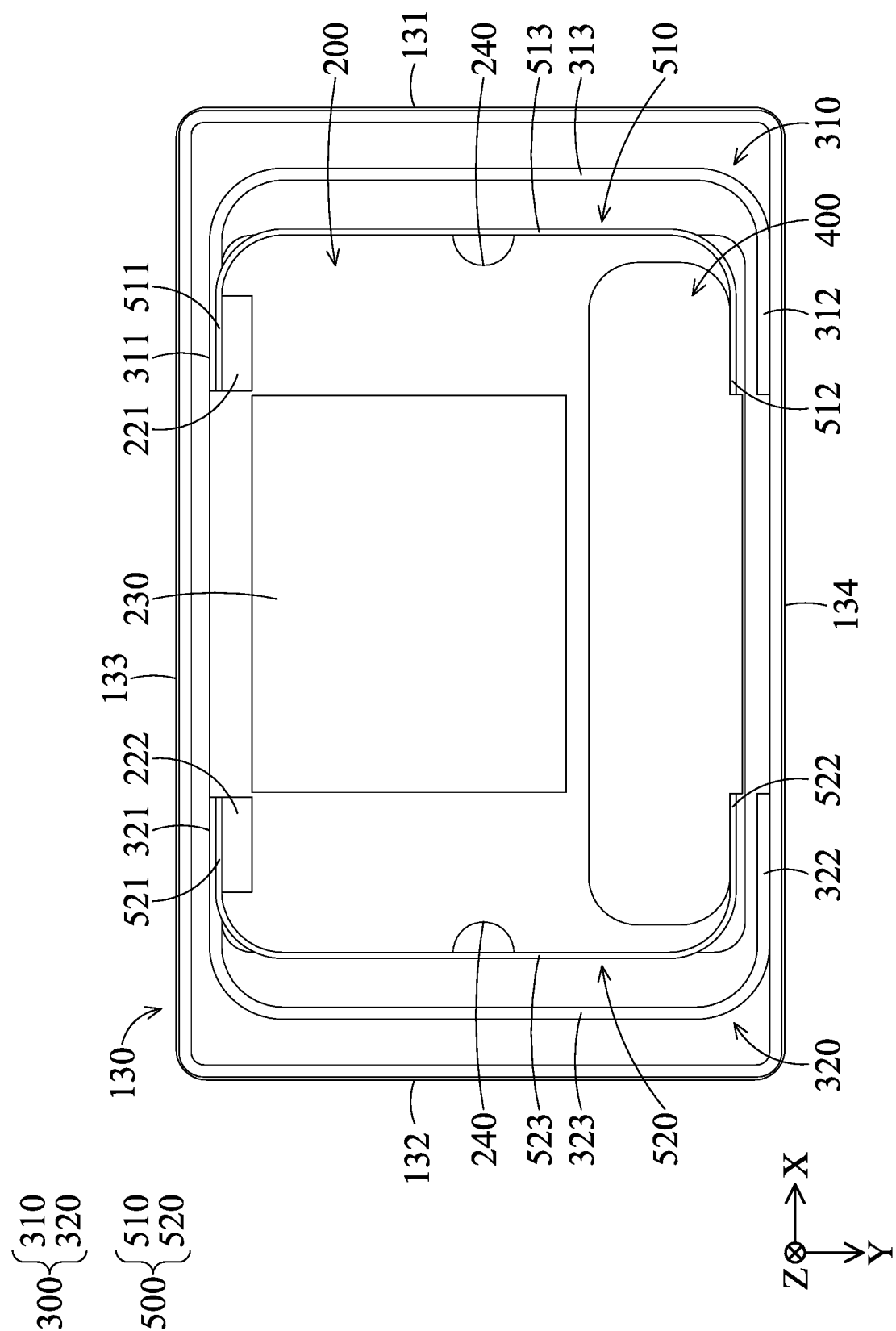
FIG. 2B shows a bottom view of a case, the first movable portion, the first connecting assembly, the second movable portion, and the second connecting assembly, according to some embodiments of the present disclosure.
Figure 2C:
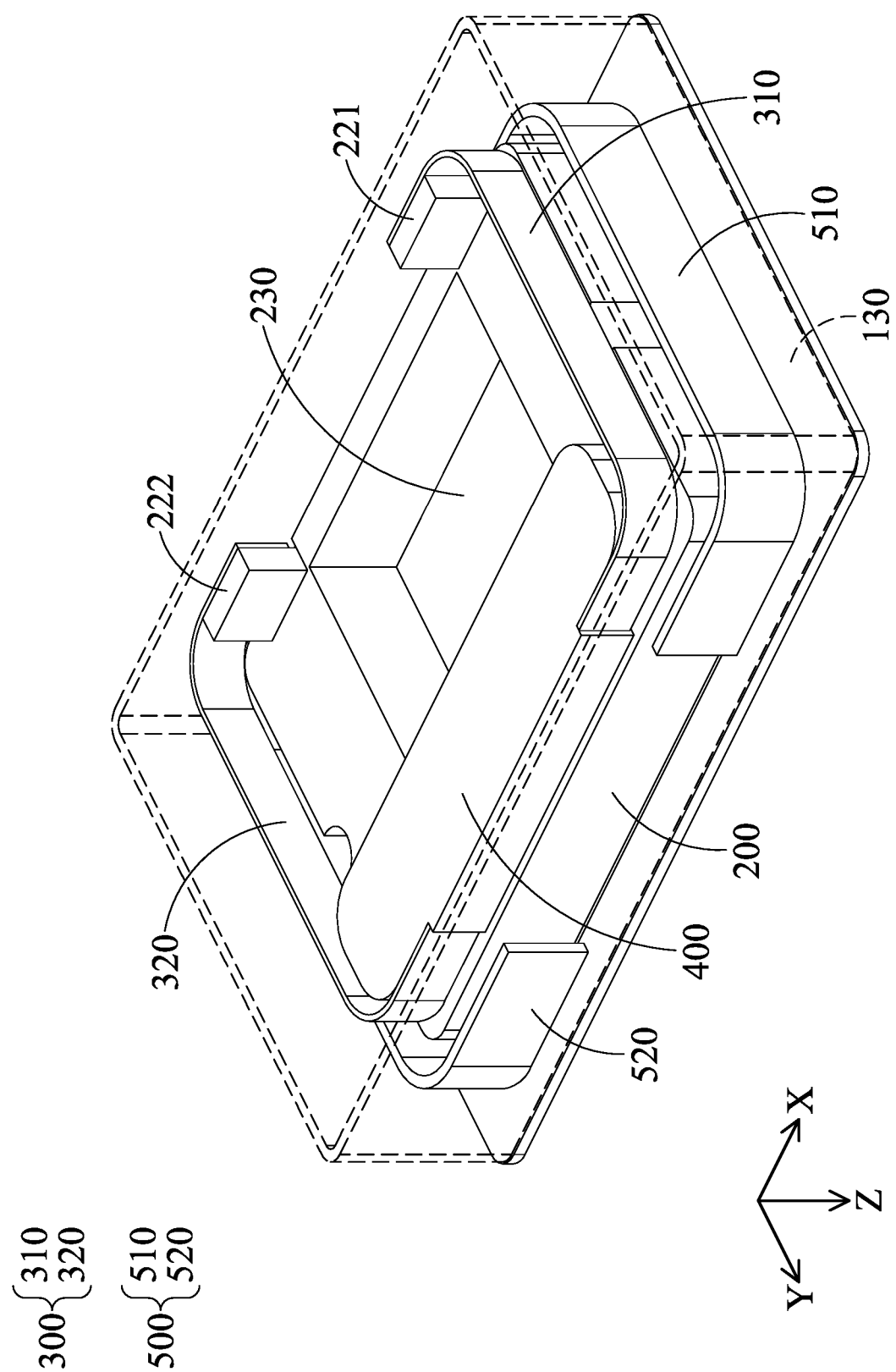
FIG. 2C shows a perspective view of the case, the first movable portion, the first connecting assembly, the second movable portion, and the second connecting assembly, according to some embodiments of the present disclosure, with the case shown in dash line for illustration purposes.

FIG. 2A is an exploded view of the first movable portion 200, the first connecting assembly 300, the second movable portion 400, and the second connecting assembly 500, according to some embodiments of the present disclosure. FIG. 2B is a bottom view of the case 130, the first movable portion 200, the first connecting assembly 300, the second movable portion 400, and the second connecting assembly 500, according to some embodiments of the present disclosure. FIG. 2C is a perspective view of the case 130, the first movable portion 200, the first connecting assembly 300, the second movable portion 400, and the second connecting assembly 500, according to some embodiments of the present disclosure, with the case 130 shown in dash line for illustration purposes.

Please refer to FIG. 2A to FIG. 2C together, the first movable portion 200 includes two connecting portions 211 and 212, two protrusions 221 and 222, a hollow portion 230, and two recesses 240. The first elastic component 310 includes two fixed ends 311 and 312, and an elastic portion 313. The second elastic component 320 includes two fixed ends 321 and 322, and an elastic portion 323. The second movable portion 400 includes two connecting portions 411 and 412. The third elastic component 510 includes two fixed ends 511 and 512, and an elastic portion 513. The fourth elastic component 520 includes two fixed ends 521 and 522, and an elastic portion 523.

The fixed end 311 of the first elastic component 310 and the fixed end 321 of the second elastic component 320 are connected to the first movable portion 200. The fixed end 312 of the first elastic component 310 and the fixed end 322 of the second elastic component 320 are connected to the fixed portion 100, the details of which is described in detail below.

The fixed end 511 of the third elastic component 510 and the fixed end 521 of the fourth elastic component 520 are connected to the first movable portion 200. The fixed end 512 of the third elastic component 510 and the fixed end 522 of the fourth elastic component 520 are connected to the second movable portion 400, the details of which is described in detail below.

The connecting portions 211 and 212 of the first movable portion (FIG. 2A) 200 are adjacent to the third sidewall 133 of the case 130 (FIG. 2B). The connecting portion 211 is connected to the fixed end 311 of the first elastic component 310 via soldering. The connecting portion 212 is connected to the fixed end 321 of the second elastic component 320 via soldering.

The protrusions 221 and 222 of the first movable portion 200 protrude from the surface of the first movable portion 200 facing the lower cover 120 (FIG. 1B). The protrusions 221 and 222 are adjacent to the third sidewall 133. The protrusion 221 includes a connecting surface 2211 facing the third sidewall 133. The protrusion 222 includes a connecting surface 2221 facing the third sidewall 133. The connecting surface 2211 is connected to the fixed end 511 of the third elastic component 510 via soldering. The connecting surface 2221 is connected to the fixed end 521 of the fourth elastic component 520 via soldering.

The hollow portion 230 of the first movable portion 200 has a substantially rectangular shape. The hollow portion 230 is configured to accommodate the magnetic components 720 of the driving assembly 700 (FIG. 1B). In this way, the thickness of the first movable portion 200 in the second direction (the Z direction) may be reduced, so as to achieve the effect of thinning the mechanism.

The recesses 240 of the first movable portion 200 are located on two opposite sides facing the first elastic component 310 and the second elastic component 320 respectively. The recesses 240 are configured to locate the first movable portion 200 during assembly.

The fixed end 311 of the first elastic component 310 is substantially parallel to the fixed end 312. The fixed end 312 is connected to the fourth sidewall 134 of the case 130 via soldering. The fixed end 311 and the fixed end 312 are located at two ends of the elastic portion 313.

The fixed end 321 of the second elastic component 320 is parallel to the fixed end 322. The fixed end 322 is connected to the fourth sidewall 134 of the case 130 via soldering. The fixed end 321 and the fixed end 322 are located at two ends of the elastic portion 323.

In this way, with the first connecting assembly 300 movably connected to the first movable portion 200, the first movable portion 200 is movable in the tactile feedback system 10 to generate a vibration sensation when the driving assembly 700 drives the first movable portion 200.

The second movable portion 400 includes a connecting portion 411 and 412 facing the fourth sidewall 134. The connecting portion 411 is connected to the fixed end 512 of the third elastic component 510 via soldering. The connecting portion 412 is connected to the fixed end 522 of the fourth elastic component 520 via soldering.

The fixed end 511 of the third elastic component 510 is substantially parallel to the fixed end 512. The fixed end 511 and the fixed end 512 are located at two ends of the elastic portion 513.

The fixed end 521 of the fourth elastic component 520 is parallel to the fixed end 522. The fixed end 521 and the fixed end 522 are located at two ends of the elastic portion 523.

In this way, with the second connecting assembly 500 movably connected to the first movable portion 200, the second movable portion 400 may generate a movement through the movement of the first movable portion 200 when the driving assembly 700 drives the first movable portion 200, to generate two vibration sensations in the tactile feedback system 10.

Specifically, with the configuration of the first movable portion 200 and the second movable portion 400, the tactile feedback system 10 may generate two vibration modes. For example, in one vibration mode, when the driving assembly 700 outputs a first driving signal with a first frequency, the first movable portion 200 moves relative to the fixed portion 100 (FIG. 1) in a first motion mode (e.g., linear motion), and the second movable portion 400 moves relative to the fixed portion 100 in a second motion mode. In another vibration mode, when the driving assembly 700 outputs a second driving signal with a second frequency, the first movable portion 200 moves relative to the fixed portion 100 in the first motion mode (e.g., linear motion), and the second movable portion 400 moves relative to the fixed portion 100 in a third motion mode. It should be understood that the second motion mode is different from the third motion mode, such as, different in direction, phase, etc.

As shown in FIG. 2B, the first connecting assembly 300 and the second connecting assembly 500 only partially overlap between the fixed ends 311 and 511 and between the fixed ends 321 and 521 in the second direction (the Z direction). The first connecting assembly 300 and the second connecting assembly 500 do not overlap in the second direction (the Z direction) except for the overlap between the fixed ends 311 and 511 and the overlap between the fixed ends 321 and 521. As shown in FIG. 2B, in the present embodiment, both the first connecting assembly 300 and the second connecting assembly 500 have bilateral symmetrical structure.

Figure 3:
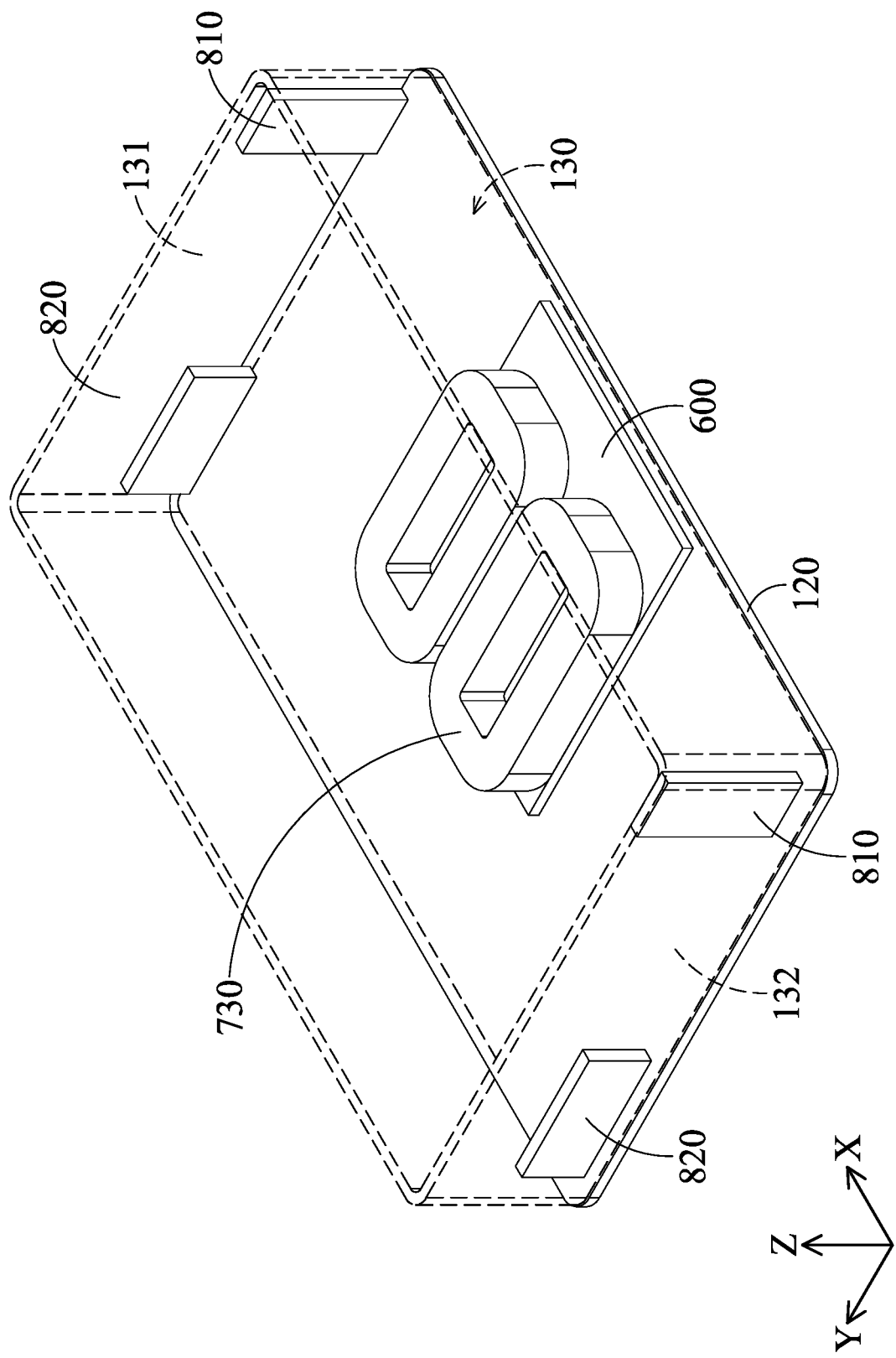
FIG. 3 shows a perspective view of a lower cover, the case, a circuit member, a coil, a first buffer component, and a second buffer component, according to some embodiments of the present disclosure, with the case shown in dash line for illustration purposes.

FIG. 3 is a perspective view of the lower cover 120, the case 130, the circuit member 600, the coils 730, the first buffer components 810, and the second buffer components 820, according to some embodiments of the present disclosure, with the case 130 shown in dash line for illustration purposes.

As shown in FIG. 3, the circuit member 600 is fixedly disposed on the lower cover 120. The coils 730 are fixedly disposed on the circuit member 600. The two first buffer components 810 are disposed on the corresponding positions of the first sidewall 131 and the second sidewall 132 of the case 130 respectively. The two second buffer components 820 are disposed on the corresponding positions of the first sidewall 131 and the second sidewall 132 of the case 130 respectively.

As shown in FIG. 3, the first buffer components 810 and the second buffer components 820 are in the same shape. Specifically, both the first buffer components 810 and the second buffer components 820 have an elongated structure. However, the first buffer components 810 and the second buffer components 820 are disposed in different orientations, resulting in the first buffer components 810 and the second buffer components 820 extending in different directions. The first buffer components 810 extend along the Z direction. The second buffer components 820 extend along the Y direction.

Figure 4:
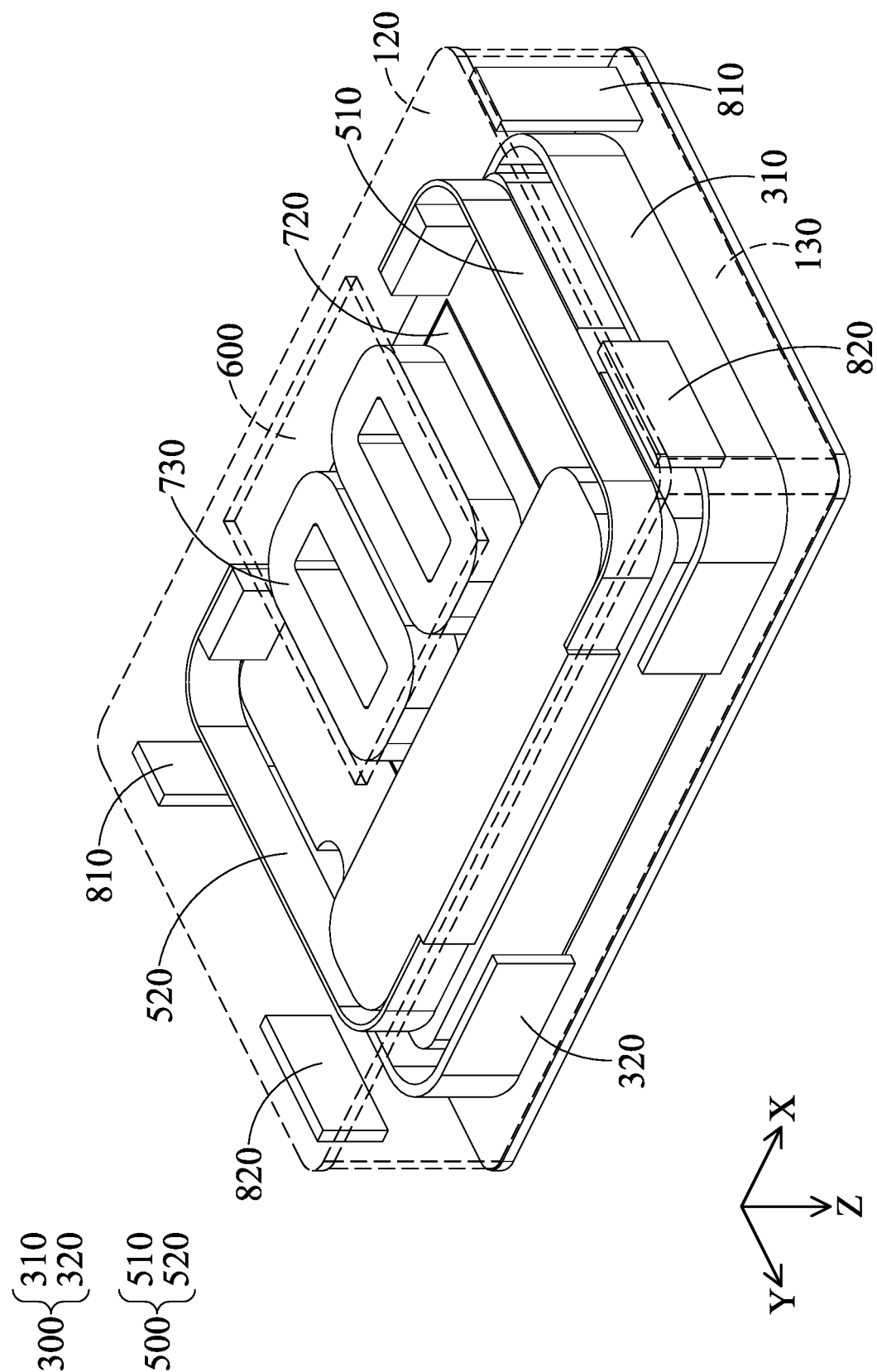
FIG. 4 is a perspective view of the tactile feedback system of FIG. 1A upside down, with the lower cover, the case, and the circuit members shown in dash line for illustration purposes.

FIG. 4 is a perspective view of the tactile feedback system 10 in FIG. 1A upside down, wherein the lower cover 120, the case 130, and the circuit member 600 are shown in dash line for illustration purposes.

As shown in FIG. 4, the structures of the third elastic component 510 and the fourth elastic component 520 form a space in the tactile feedback system 10, and the coils 730 disposed on the circuit member 600 are accommodated in such a space. In other words, the second connecting assembly 500 and the coils 730 are located at the same height in the Z direction. With this configuration, the tactile feedback system 10 of the present invention may reduce its size in the Z direction, so as to achieve the effect of thinning the mechanism.

As shown in FIG. 4, the first buffer components 810 are disposed between the case 130 and the first movable portion 200. The second buffer components 820 are disposed between the case 130 and the second movable portion 400. This configuration may buffer the direct impact of the first movable portion 200 and the second movable portion 400 on the case 130 during abnormal motion, and prevent the first movable portion 200 and the second movable portion 400 from generating abnormal noise during abnormal motion.

As shown in FIG. 4, the first buffer component 810 at least partially overlaps with the second connecting assembly 500 in the first direction (the -X direction). The second buffer component 820 does not overlap with the first connecting assembly 300 in the first direction (the -X direction).

Figure 5:
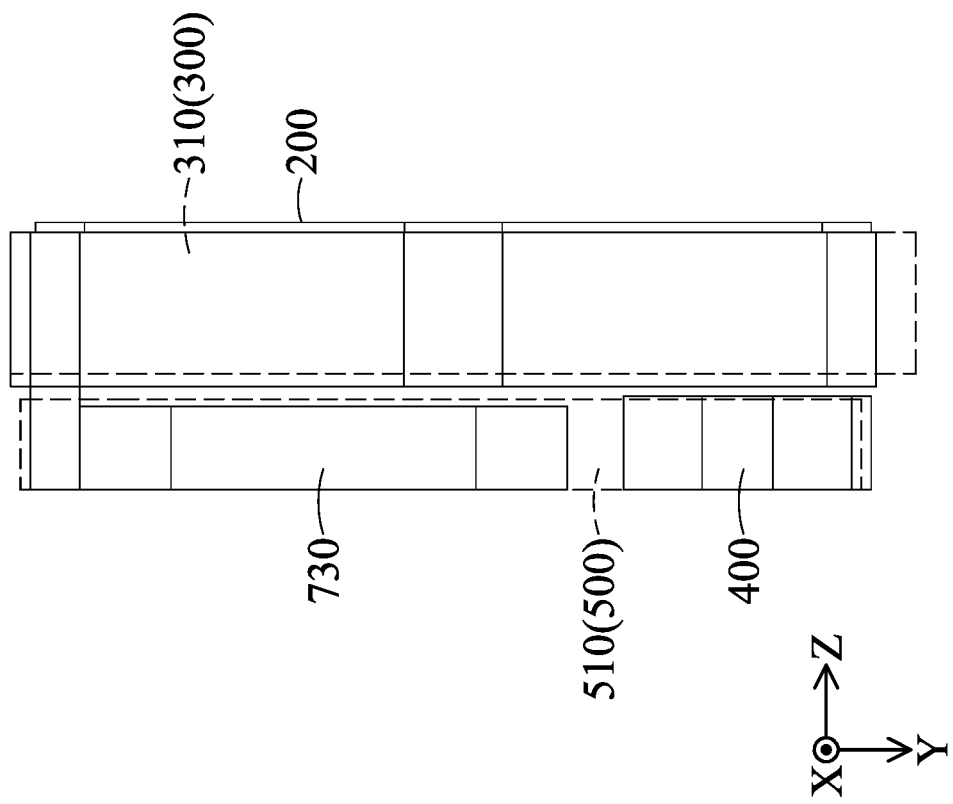
FIG. 5 is a side view of the first movable portion, a first elastic component, the second movable portion, a third elastic component, and the coil in FIG. 4, with the first elastic component and the third elastic component shown in dash line for illustration purposes.

FIG. 5 is a side view of the first movable portion 200, the first elastic component 310, the second movable portion 400, the third elastic component 510, and the coils 730 in FIG. 4, with the first elastic component 310 and the third elastic component 510 shown in dash line for illustration purposes.

Please refer to FIG. 4 to FIG. 5 together, the first connecting assembly 300 and the driving assembly 700 at least partially overlap in the first direction (the -X direction). Specifically, the first connecting assembly 300 overlaps with the magnetic components 720 (FIG. 1B) provided in the first movable portion 200 in the first direction (the -X direction). In addition, the first connecting assembly 300 does not overlap with the coils 730 in the first direction (the -X direction).

As shown in FIG. 4 to FIG. 5, the first connecting assembly 300 and the second connecting assembly 500 do not overlap in the first direction (the -X direction). The second connecting assembly 500 and the driving assembly 700 at least partially overlap in the first direction (the -X direction). Specifically, the second connecting assembly 500 overlaps with the coil 730 in the first direction (the -X direction). In addition, the second connecting assembly 500 does not overlap with the magnetic component 720 disposed in the first movable portion 200 in the first direction (the -X direction).

Figure 6:
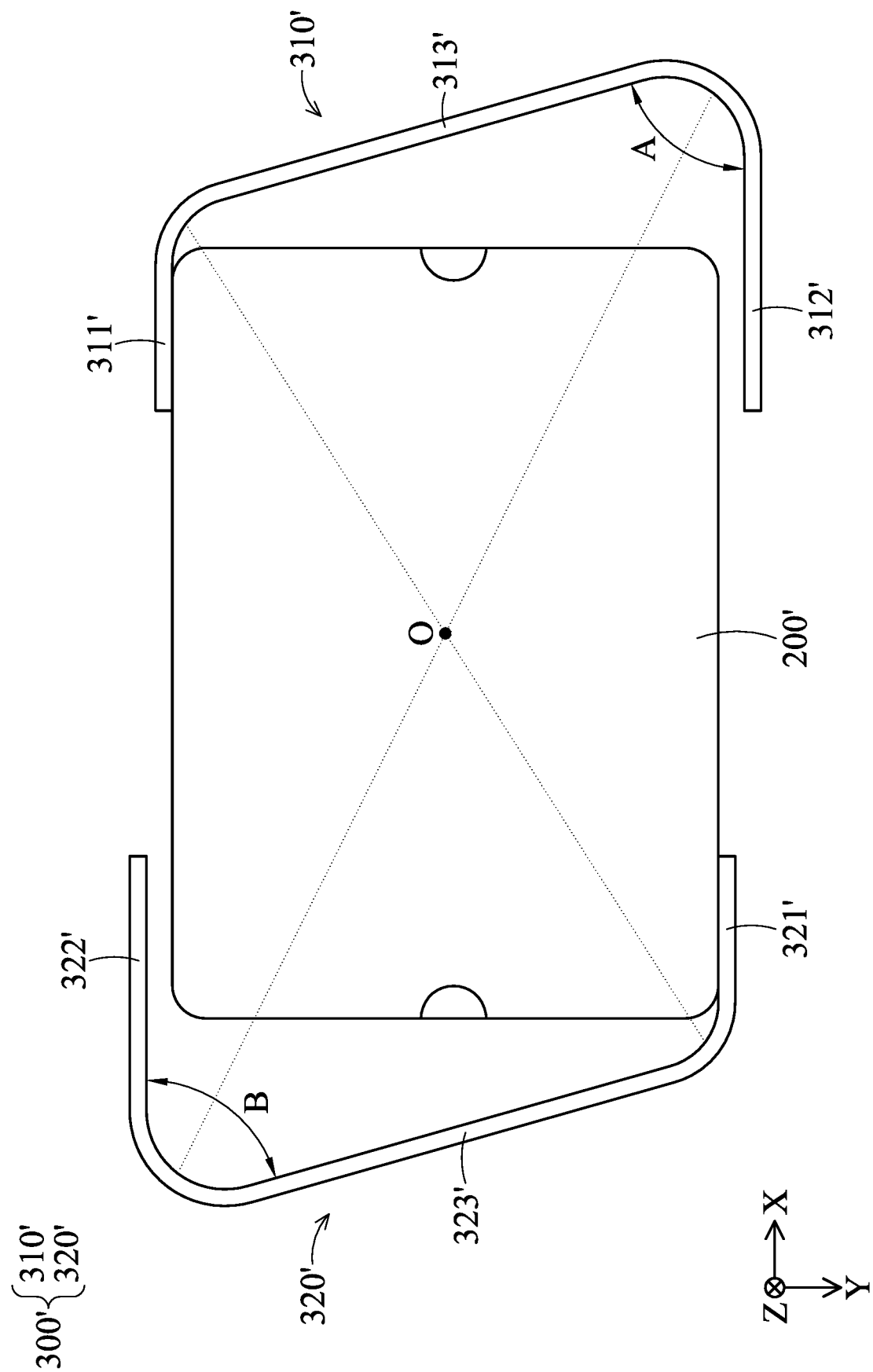
FIG. 6 shows a first movable portion and a first connecting assembly, according to another embodiment of the present disclosure.

FIG. 6 shows a first movable portion 200' and a first connecting assembly 300', according to another embodiment of the present disclosure. The difference between the first connecting assembly 300 of the aforementioned embodiment and the first connecting assembly 300' in FIG. 6 is that, the fixed ends 311 and 321 of the first connecting assembly 300 are fixed on the same side of the first movable portion 200. For example, as shown in FIG. 2B, the fixed ends 311 and 321 are both fixed on the side which is closer to the third sidewall 133. On the contrary, the fixed ends 311' and 321' of the first connecting assembly 300' in this embodiment are fixed on opposite sides of the first movable portion 200'. The fixed end 311' is fixed on the upper side of the first movable portion 200', the fixed end 321' is fixed on the lower side of the first movable portion 200'. Therefore, the fixed ends 311' and 321' are respectively fixed on the opposite sides of the first movable portion 200'.

As shown in FIG. 6, an angle A may be formed between the fixed end 312' and the elastic portion 313', and an angle B may be formed between the fixed end 322' and the elastic portion 323'. Although the angle A and the angle B are equal in this embodiment, it should be understood that the relationship between the angle A and the angle B is not defined in this embodiment, and the angle should be designed according to requirements. Specifically, the angle affects the spring stiffness, which affects the vibration frequency, so the angle and shape of the spring is designed depending on the space and frequency requirements.

As shown in FIG. 6, when viewed along the Z direction, the first connecting assembly 300' combined with the first movable portion 200' is substantially in the shape of a parallelogram. In addition, the shape of the first connecting assembly 300' has rotational symmetry. That is, if the first connecting assembly 300' is rotated by an angle, for example, 180 degrees, around a fixed point O, which is the intersection of the two diagonals of the first connecting assembly 300', the shape of the first connecting assembly 300' still coincides with the shape before the rotation.

To sum up, the tactile feedback system of the present invention has two movable portions. The first movable portion is connected to the fixed portion via the first connecting assembly. The second movable portion is connected to the first movable portion via the second connecting assembly. Therefore, through the motion of the two movable portions, the tactile feedback system of the present invention may generate various vibration sensations. In addition, the second connecting assembly surrounds a space in the tactile feedback system, and the coil provided on the circuit member is accommodated in this space. With this configuration, the tactile feedback system of the present invention may reduce its size in thickness, so as to achieve the effect of thinning the mechanism.

The ordinal numbers in this specification and the claim, such as "first", "second", etc., do not have a sequential relationship between each other, and they are only used to distinguish two different components with the same name.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A tactile feedback system, comprising:
   a fixed portion;
   a first movable portion movable relative to the fixed portion;
   a second movable portion movable relative to the fixed portion and the first movable portion;
   a driving assembly configured to drive the first movable portion to move relative to the fixed portion;
   a first connecting assembly, wherein the first movable portion is movably connected to the fixed portion via the first connecting assembly; and
   a second connecting assembly, wherein the second movable portion is movably connected to the first movable portion via the second connecting assembly.

2. The tactile feedback system as claimed in claim 1, wherein the first connecting assembly comprises a first elastic component and a second elastic component, and shapes of the first elastic component and the second elastic component have rotational symmetry.

3. The tactile feedback system as claimed in claim 1, wherein the first movable portion comprises a protrusion comprising a connecting surface, the second connecting assembly comprises a fixed end, wherein the connecting surface is connected to the fixed end of the second connecting assembly.

4. The tactile feedback system as claimed in claim 1, wherein the second connecting assembly comprises a third elastic component and a fourth elastic component, and shapes of the third elastic component and the fourth elastic component have rotational symmetry.

5. The tactile feedback system as claimed in claim 1, wherein the driving assembly comprises a magnetic component and a coil, and the first connecting assembly comprises a first elastic component and a second elastic component, wherein a first direction, which is the direction from the first elastic component to the second elastic component, is perpendicular to a second direction, which is the direction from the second movable portion to the first movable portion.

6. The tactile feedback system as claimed in claim 5, wherein the first connecting assembly and the second connecting assembly do not overlap in the first direction.

7. The tactile feedback system as claimed in claim 5, wherein the first connecting assembly and the second connecting assembly partially overlap in the second direction.

8. The tactile feedback system as claimed in claim 5, wherein the first connecting assembly and the driving assembly at least partially overlap in the first direction.

9. The tactile feedback system as claimed in claim 5, wherein the first connecting assembly and the magnetic component at least partially overlap in the first direction.

10. The tactile feedback system as claimed in claim 5, wherein the first connecting assembly and the coil do not overlap in the first direction.

11. The tactile feedback system as claimed in claim 5, wherein the second connecting assembly and the driving assembly at least partially overlap in the first direction.

12. The tactile feedback system as claimed in claim 5, wherein the second connecting assembly and the coil at least partially overlap in the first direction.

13. The tactile feedback system as claimed in claim 5, wherein the second connecting assembly and the magnetic component do not overlap in the first direction.

14. The tactile feedback system as claimed in claim 1, wherein the driving assembly comprises a magnetically permeable component, wherein the first movable portion and the second movable portion each has a non-magnetically permeable metal.

15. The tactile feedback system as claimed in claim 14, wherein a magnetic permeability of the magnetically permeable component is greater than a magnetic permeability of the first movable portion and a magnetic permeability of the second movable portion.

16. The tactile feedback system as claimed in claim 1, further comprising:
   a first buffer component disposed between the fixed portion and the first movable portion; and
   a second buffer component disposed between the fixed portion and the second movable portion;
   wherein the first buffer component and the second buffer component both have an elongated structure, and the first buffer component and the second buffer component extend in different directions, wherein a first direction is from the second buffer component to the second connecting assembly, the first connecting assembly and the second buffer component do not overlap in the first direction, and the second connecting assembly and the first buffer component at least partially overlap in the first direction.

17. The tactile feedback system as claimed in claim 1, wherein:
   when the driving assembly outputs a first driving signal with a first frequency, the first movable portion moves relative to the fixed portion in a first motion mode, and the second movable portion moves relative to the fixed portion in a second motion mode;
   when the driving assembly outputs a second driving signal with a second frequency, the first movable portion moves relative to the fixed portion in the first motion mode, and the second movable portion moves relative to the fixed portion in a third motion mode.

18. The tactile feedback system as claimed in claim 17, wherein the second motion mode is different from the third motion mode.

* * * * *